(12) United States Patent
Sakazaki et al.

(10) Patent No.: US 6,712,098 B2
(45) Date of Patent: Mar. 30, 2004

(54) FUEL HOSE, FUEL HOSE CONNECTION METHOD, AND FUEL HOSE CONNECTION STRUCTURE

(75) Inventors: Kazushige Sakazaki, Aichi (JP); Koji Hioki, Aichi (JP); Atsuo Miyajima, Aichi (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/365,967

(22) Filed: Feb. 13, 2003

(65) Prior Publication Data

US 2003/0159744 A1 Aug. 28, 2003

(30) Foreign Application Priority Data

Feb. 22, 2002 (JP) .................................. 2002-046290
Dec. 2, 2002 (JP) .................................. 2002-349579

(51) Int. Cl.[7] .............................................. F16L 21/00
(52) U.S. Cl. ...................... 138/109; 138/155; 285/374; 285/231
(58) Field of Search ................................. 138/109, 155; 285/226, 221.1, 236, 21.1, 374, 231

(56) References Cited

U.S. PATENT DOCUMENTS 4,047,739 A * 9/1977 Aitken ...................... 285/21.1
5,664,608 A    9/1997 Kawasaki .................. 138/139
5,791,696 A    8/1998 Miyajima et al. ............. 285/39
6,345,844 B1 * 2/2002 Miyajima et al. ............. 285/39
6,607,218 B2 * 8/2003 Sakazaki et al. ............ 285/226

FOREIGN PATENT DOCUMENTS

JP    08-294979     11/1996
JP    2002-054779    2/2002

* cited by examiner

Primary Examiner—Patrick Brinson
(74) Attorney, Agent, or Firm—Darby & Darby (57) ABSTRACT

A straight opposing member insertion section located at the end of a hose tube and has a ring-shaped groove for inserting a sealing ring. The opposing member insertion section has a ring-shaped tongue piece and/or a ring-shaped ring supporting section. Tongue-piece has a sloped surface and an overhang positioned over the ring-shaped groove. Ring supporting section is an indentation on the ring-shaped groove that protrudes away from the end of the hose tube. A sealing ring is tightly inserted into the ring-shaped groove. A ring-shaped engagement projection on the end of the tube-shaped opposing member is pushed into the opposing member insertion section until the engagement projection abuts the sealing ring. Sealing ring and the section of the tube wall with the ring-shaped groove can be constructed to handle seal deterioration. The resulting fuel hose connection structure has superior fuel sealing properties, fuel impermeability and can be contructed simply and inexpensively.

19 Claims, 7 Drawing Sheets

FUEL HOSE, FUEL HOSE CONNECTION METHOD, AND FUEL HOSE CONNECTION STRUCTURE

FIELD OF THE INVENTION

The present invention relates to a method and an apparatus for connecting a fuel hose. More specifically, the present invention relates to a fuel hose connection method that involves using a ring-shaped sealing member, a hard, pipe-shaped opposing member, and a fuel hose. The opposing member can be a pipe made of metal or resin. The fuel hose has an opposing member insertion section for ensuring a fluid-tight connection between the opposing member and the fuel hose. The present invention also relates to a fuel hose connection structure based on the fuel hose connection method.

BACKGROUND OF THE INVENTION

U.S. Pat. No. 5,664,608 (EP 0591831 A2) discloses a conventional, multi-layer hose with an outer layer made of rubber. Except for a pipe insertion section, the inner perimeter surface of the hose has a thin inner layer made of a hard metal or resin material having low fuel permeability. The publication states that fuel seepage to the outside is adequately prevented since the section of the inner perimeter surface of the hose that contacts the fuel has an inner layer having low fuel permeability. The publication also states that the hard inner layer is not formed at the pipe insertion section of the hose. Therefore, the required force to insert the pipe is reduced, and there is a high degree of sealing at the pipe connection section. However, since a fixed amount of fuel seeps into the contact section between the inner layer and the pipe, this conventional hose does not provide low fuel permeability, which is required due to stricter regulations on fuel permeability and the like.

Figure 1:
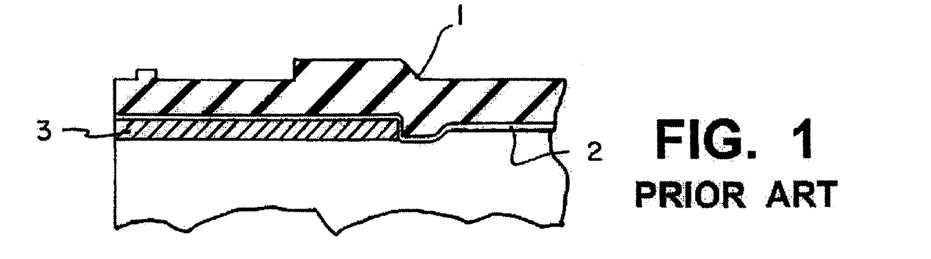
FIG. 1 is an axial, partial cross-sectional drawing of a conventional fuel hose.

Japanese Laid-Open Patent Publication Number Hei 8-294979 shown in FIG. 1 discloses a fuel hose having a rubber protector 1 covering a fluorocarbon resin tube 2. A sealing rubber 3 having low fuel permeability is adhered by vulcanization to the inner perimeter surface of the pipe insertion section of the fluorocarbon resin tube 2. The publication states that the presence of the sealing rubber 3 in the fuel hose reduces the insertion force to insert the pipe and maintains good fuel sealing properties. The publication also states that lower fuel permeability can be achieved by extending the fluorocarbon resin tube 2 to the end of the fuel hose. However, since the pipe is inserted into the hard fluorocarbon resin tube 2 having the sealing rubber 3 on the inner perimeter surface, the pipe is difficult to insert since the required insertion force is very high. Also, the sealing rubber 3 is made of a rubber material having low fuel permeability which is expensive, thereby increasing the cost of the fuel hose. Furthermore, the vulcanized adhesion process used for preventing misalignment of the sealing rubber 3 when the pipe is inserted also increases the cost of the fuel hose.

OBJECTS AND SUMMARY OF THE INVENTION

The present invention provides a fuel hose having low fuel permeability when connecting to pipes and superior fuel sealing properties. The fuel hose of the present invention also reduces the insertion force required to insert the pipe and does not require special increases in cost. Additionally, the present invention provides a method and an apparatus for connecting the fuel hose. Furthermore, the present invention effectively handles the unavoidable degradation in fuel permeability and sealing properties due to aging of the material in the fuel hose connection structure.

A fuel hose of the present invention includes a hose tube and a straight opposing member insertion section. The hose tube is made of a rubber or elastomer, and the opposing member insertion section is located at an end of the hose tube. A sealing ring is inserted into and fits inside a ring-shaped groove located on a section of the inner perimeter surface of the opposing member insertion section which is located toward a center side of the fuel hose along the hose axis (i.e., away from the end of the fuel hose). A ring-shaped tongue piece having a sloped surface hangs over the ring-shaped groove. The tongue piece is located inward in the radial direction from a side wall of the ring-shaped groove that is located toward an end side of the fuel hose along the hose axis (i.e., toward the end of the fuel hose). A thin resin layer having low fuel permeability covers the inner perimeter surface of the ring-shaped groove, including the tongue piece, and the entire inner perimeter surface of the hose tube from the ring-shaped groove toward the center side of the fuel hose along the hose axis (i.e., away from the end of the fuel hose).

"Ring-shaped" refers to a continuous shape extending over the entire perimeter of the hose tube or the hard, tube-shaped opposing member. "A tongue piece having a sloped surface and hanging over the ring-shaped groove" indicates a tongue piece, which has a sloped surface, with lip-shaped cross-section that increases gradually in size over the space of the ring-shaped groove as it extends toward the center side of the fuel hose along the hose axis (i.e. toward the end of the fuel hose).

The present invention provides the following advantages with regard to fuel sealing properties, low fuel permeability, and insertion force on the opposing member.

The sealing member typically provides the fuel sealing properties in fuel hose connection structures, but the sealing member requires a sufficient securing force to prevent misalignment when the hose is connected. As described above, Japanese Laid-Open Patent Publication Number Hei 8-294979 discloses a fuel hose in which the sealing rubber is adhered by vulcanization to the low fuel permeability resin layer to prevent the misalignment of the sealing rubber when the hose is connected. However, vulcanization increases the cost of the fuel hose.

The sealing ring of the present invention is tightly inserted into the ring-shaped groove to ensure a high securing force on the sealing ring and to prevent misalignment of the sealing ring. Thus, the sealing ring of the present invention has a very high securing force without requiring a special process such as vulcanization.

Furthermore, after the hard, tube-shaped opposing member is connected, the engagement projection of the opposing member of the present invention is tightly secured to the ring-shaped groove of the hose tube via the low fuel permeability resin layer and the sealing ring. As a result, the fuel sealing properties are especially good when the pipe is connected.

A thin, low fuel permeability resin layer of the present invention covers the inner perimeter surface of the ring-shaped groove and the entire inner perimeter surface of the hose tube from the ring-shaped groove toward the center side of the fuel hose along the hose axis (i.e., away from the end of the fuel hose). The thin, low fuel permeability resin layer covers not only the inner perimeter surface of the hose tube which contacts the fuel, but also the inner perimeter surface of the ring-shaped groove to which the opposing member is inserted. As a result, there is no risk of fuel leakage at the connecting section of the fuel hose between the low fuel permeability resin layer and the opposing member. Thus, the connecting section has low fuel permeability.

The hard, tube-shaped opposing member is inserted into the straight opposing member insertion section of the fuel hose according to the present invention. The presence of the hard, low fuel permeability resin layer increases the insertion force required to insert the opposing member. However, the resin layer is only formed at the ring-shaped groove, and most of the hose tube is formed from soft rubber or elastomer. As a result, the insertion force on the opposing member can be remain low.

According to another embodiment of the present invention, a fuel hose can include a rubber or elastomer hose tube and a straight opposing member insertion section formed at the end of the hose tube. A ring-shaped groove for inserting and fitting a sealing ring is located on the inner perimeter surface of the opposing member insertion section toward a center side of the fuel hose along the hose axis (away from the end of the fuel hose). A ring-shaped ring supporting section depressed toward the center side of the fuel hose along the hose axis (away from the end of the fuel hose) is located on the side wall of the ring-shaped groove toward the center side of the fuel hose along the hose axis (away from the end of the fuel hose). A thin, low fuel permeability resin layer covers the inner perimeter surface of the ring-shaped groove, including the ring-shaped ring supporting section, and an entire inner perimeter surface of the hose tube from the ring-shaped groove toward the center side of the fuel hose along the hose axis (away from the end of the fuel hose).

The present invention provides similar advantages for low fuel permeability and low insertion force on the opposing member. The securing force on the sealing ring is provided by tightly inserting the sealing ring into the ring-shaped groove, and fuel sealing properties are provided by tightly fitting and securing the engagement projection of the opposing member in the ring-shaped groove.

However, a securing force on the sealing ring is not provided from a tongue piece when the fuel hose is connected to the opposing member as described above. Instead, the ring-shaped ring supporting section provides especially strong support and secures the sealing ring when the fuel hose is connected to the opposing member. Thus, a very strong securing force on the sealing ring can be provided without the use of a special process such as vulcanized adhesion.

According to another embodiment of the present invention, the ring-shaped groove having a ring-shaped tongue piece can include a ring supporting section as described above.

The ring-shaped groove can have both the tongue piece and the ring supporting section. Thus, the securing force on the sealing ring is especially strong due to the combined advantages of the tongue piece and the ring supporting section. This embodiment of the present invention provides similar operations and advantages as the previously described embodiments.

According to another embodiment of the present invention, the ring-shaped groove can have a stopper projecting inward in the radial direction past the inner perimeter surface of the opposing insertion member. The stopper is located inward in the radial direction on the side wall of the ring-shaped groove located toward the center side of the fuel hose along the hose axis (away from the end of the fuel hose).

Therefore, when the fuel hose and the opposing member are connected, the hard, tube-shaped opposing member is pushed into the opposing member insertion section of the fuel hose until it abuts the stopper. Thus, the engagement projection of the opposing member can abut the sealing ring so that the engagement projection is tightly fitted to the ring-shaped groove. The fuel hose is easy to connect since there is no need to align the opposing member.

According to another embodiment of the present invention, a fuel hose can have a tube wall section of the opposing member insertion section having a ring-shaped groove as described in any one of (A)–(D) below:

(A) an outer perimeter section of the tube wall with the ring-shaped groove is thicker outward in the radial direction than the other wall sections;

(B) an inner perimeter section of the tube wall with the ring-shaped groove is thicker inward in the radial direction than the other wall sections;

(C) an inner perimeter section of the tube wall with the ring-shaped groove has a ridge projecting inward in the radial direction; and (D) a clamp or a ring is tightly mounted on an outer perimeter section of the tube wall with the ring-shaped groove.

This embodiment of the present invention provides the advantages of any one of the previously described embodiments, such as a high securing force on the sealing ring, good fuel sealing properties, low fuel permeability when connecting the opposing member, reduced insertion force on the opposing member, and easy fuel hose connection. Furthermore, deterioration of fuel sealing properties over time is effectively prevented.

Rubber or elastomer hose tubes and sealing rings, which are made substantially of rubber or elastomer, are compressed by a certain amount when the hose is connected to the opposing member due to deterioration over time. This deterioration cannot be avoided and is especially noticeable when the fuel hose is used in a heated environment. As a result, the fuel sealing properties of the sealing ring described above can gradually decrease. However, (A)–(D) of the embodiment described above can be used in the tube wall with the ring-shaped groove in the opposing member insertion section. The advantages listed below can be provided. If two or more of (A)–(D) are combined, the resulting embodiment will provide combined advantages.

In (A) or (B), the rigidity at this section of the tube wall can be improved since the tube wall with the ring-shaped groove is thickened either outward or inward in the radial direction. As a result, good fuel sealing properties can be maintained despite the deterioration of the hose tube and the sealing ring. In (B), the thickening of the tube wall reduces the depth of the ring-shaped groove, thereby decreasing the securing force on the sealing ring when the opposing member is inserted. Therefore, (A) or (C) are relatively preferable.

In (C), the sealing ring can be firmly secured by having a ridge projecting inward in the radial direction from the inner perimeter section of the tube wall with the ring-shaped groove. Furthermore, the ridge will slightly protrude into the sealing ring. Thus, high fuel sealing properties are maintained along the ridge even if the hose tube or the sealing ring deteriorates.

In (D), when a ring is mounted tightly on the outer perimeter section of the tube wall with the ring-shaped groove, a strong tightening stress is applied by the ring when the opposing member is inserted. Thus, even if the hose tube or the sealing ring deteriorates, the tightening stress from the ring can maintain good fuel sealing properties. When using a clamp, the clamp can be mounted in an untightened state on the outer perimeter section of the tube wall with the ring-shaped groove, and then the clamp can be tightened after the opposing member is inserted. Otherwise, the tightened clamp would provide resistance to the insertion of the opposing member. By tightening the clamp after inserting the opposing member, insertion is easier. By tightening the clamp, the same advantages as provided by the ring described above can be provided.

Furthermore, after tightening the hose tube to the opposing member of the fuel hose, external forces may deform the tightened section of the hose tube. In such cases, any one of (A)–(D) provides strong resistance to deformation in the tightened section of the hose tube, thereby preventing one-time or continuous disruption in fuel sealing properties.

According to another embodiment of the present invention, the ring-shaped groove can be shaped to match a ring-shaped sealing ring having a fixed, belt-type axial width. The thickened section described in (A) or the ridge described in (C) can be located on the section of the tube wall with the ring-shaped groove so that the thickened section or ridge aligns with the apex of the ring-shaped engagement projection which projects from the opposing member.

The ring-shaped sealing ring with a fixed belt-shaped axial width has especially high sealing pressure when aligned with the engagement projection on the opposing member. When the opposing member is inserted, the thickened section from (A) or the ridge from (C) is disposed on the section of the tube wall with the ring-shaped groove so that the thickened section or ridge aligns with the apex of the ring-shaped engagement projection on the opposing member to be inserted. This embodiment provides improved rigidity in the tube wall as described above and a secure insertion of the ridge in the sealing ring.

According to another embodiment of the present invention, a section of the hose tube located toward the center side of the fuel hose along the hose axis (away from the end of the hose tube) relative to the opposing member insertion section is formed as one of (1)–(3) below:

(1) a straight tube;

(2) a tube with at least one bend; and (3) a straight tube or a tube with at least one bend where at least one section is a corrugated tube.

The fuel hose can be formed in any shape apart from forming a straight opposing member insertion section at the end of the hose tube.

According to another embodiment of the present invention, an outer perimeter of the hose tube of a fuel hose can have one or two of elements (a)–(d) below:

(a) a resin layer;

(b) a reinforcement thread layer;

(c) a thin metal film layer or metal laminate layer; and (d) a rubber or elastomer outer protector layer.

The fuel hose has a rubber or elastomer hose tube and a thin, low fuel permeability resin layer, but other hose elements can be included on the outer perimeter of the hose tube, if necessary.

The present invention also provides a method for connecting fuel hoses including a step for tightly inserting and fitting a sealing ring into the ring-shaped groove of a fuel hose as described above and a step for inserting a hard, tube-shaped opposing member into the fuel hose. The opposing member has an ring-shaped engagement projection projecting from an outer perimeter surface of the opposing member. The engagement projection is located at an end or near an end of the opposing member. The opposing member is inserted so that the engagement projection abuts the sealing ring.

The operation and advantages of the fuel hose connecting method according to the present invention will be described using FIGS. 2a–2d. The fuel hose 4 shown in FIGS. 2a–2d includes a ring-shaped groove 6 of an opposing member insertion section 5. The ring-shaped groove 6 includes a tongue piece 7, a ring supporting section 8, and a stopper 9. A thin, low fuel permeability resin layer 10 covers the entire inner perimeter surface from the ring-shaped groove 6 toward the center side of the fuel hose along the hose axis (away from the end of the fuel hose) and the inner perimeter surface of the ring-shaped groove 6. Also, an engagement projection 12 is located on the outer perimeter surface of the hard, tube-shaped opposing member 11 and near the end of the opposing member 11.

In FIGS. 2a–2d, the process for inserting and fitting the ring-shaped groove 6 of the sealing ring 13 is not shown, but this process can involve, for example, using a typical mounting tool for a sealing ring or some other appropriate method. During this process, the ring-shaped groove 6 secures and aligns the sealing ring 13, thereby providing reliable alignment for the sealing ring 13. Also, the ring-shaped groove 6 includes projections and cavities such as the tongue piece 7 and the ring supporting section 8. The hose tube with the ring-shaped groove 6 is made of rubber or elastomer, and the sealing ring 13 can also be formed from a similar material and can have a cross-sectional shape corresponding to the shape of the ring-shaped groove 6. Therefore, the sealing ring 13 can be tightly fitted and embedded completely in the ring-shaped groove 6.

Figure 2A:
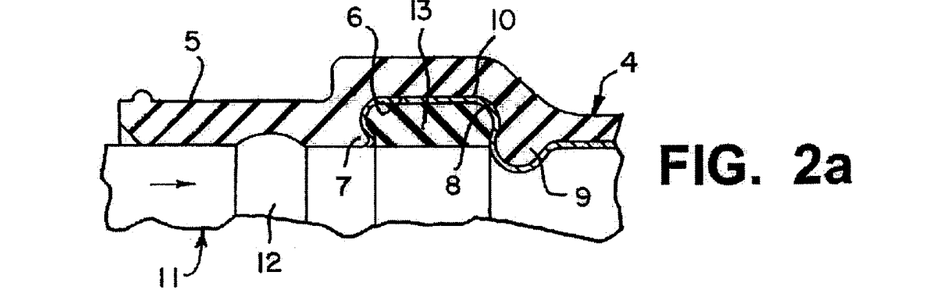
FIG. 2a is an axial, partial cross-sectional drawing of a step of a fuel hose connection method according to an embodiment of the present invention.

As shown in FIG. 2a, the hard, tube-shaped opposing member 11 is pressed into the opposing member insertion section 5. When the engagement projection 12 reaches the positions shown in FIGS. 2b and 2c, the engagement projection 12 applies a strong frictional force to the sealing ring 13 to prevent misalignment of the sealing ring 13. In extreme cases, the sealing ring 13 can drop out from the ring-shaped groove 6 without an engagement projection 12.

Figure 2B:
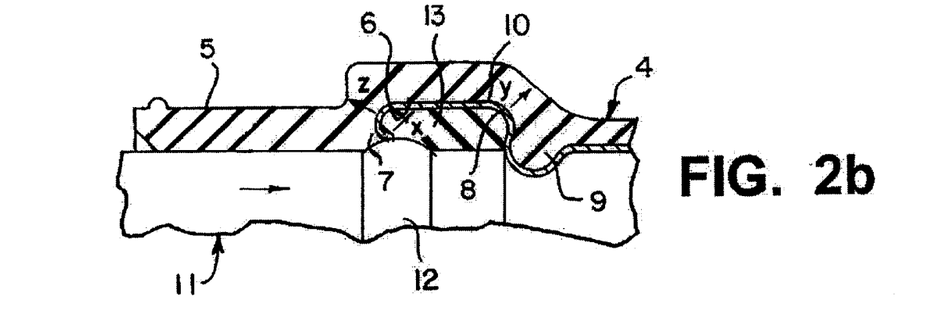
Figure 2C:
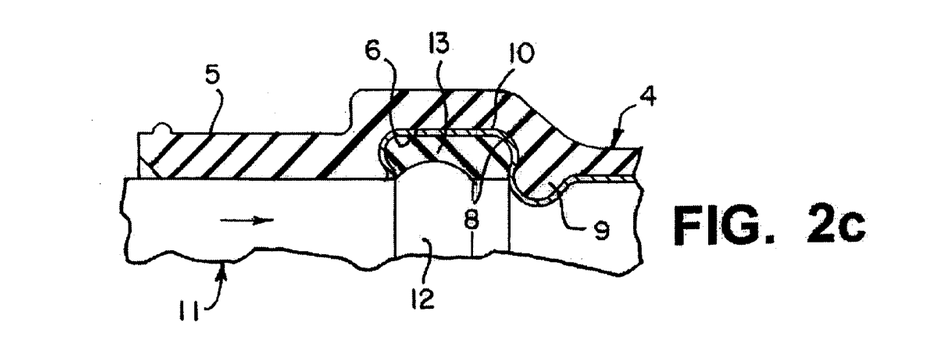
FIG. 2c is an axial, partial cross-sectional drawing of a step of a fuel hose connection method following the step shown in FIG. 2b.

However, as shown in FIGS. 2b and 2c, the engagement projection 12 pushes the tongue piece 7, which is formed with a sloped surface overhanging over the ring-shaped groove 6, upward in the direction of arrow X. The force acting in the direction of arrow X is distributed at the sealing ring 13 to forces in the direction of arrow Y and arrow Z. Thus, the sealing ring 13 firmly resists the misalignment described above. Thus, the sealing ring 13 of the present invention does not become misaligned.

Furthermore, the sealing ring 13 tries to move to the right in FIGS. 2b and 2c (toward the center side of the fuel hose along the hose axis). However, the sealing ring 13 fits in the ring supporting section 8, which is indented toward the center side of the fuel hose along the hose axis. Thus, as long as the sealing ring 13 does not escape from the ring supporting section 8, the sealing ring 13 will not become misaligned. High pressure applied to misalign the sealing ring 13 results in a strong force applied to the sealing ring 13 to fit to the ring supporting section 8. As a result, the sealing ring 13 will not become misaligned.

Figure 2D:
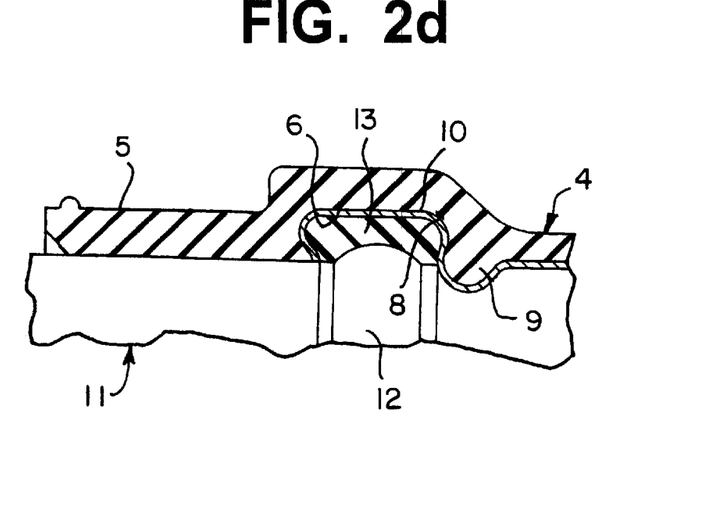
FIG. 2d is an axial, partial cross-sectional drawing of a step of a fuel hose connection method following the step shown in FIG. 2c.

The opposing member 11 can be pushed into the opposing member insertion section 5. When the opposing member 11 has been inserted deep enough, it is stopped by abutting the stopper 9, as shown in FIG. 2d. At this point, the engagement projection 12, which is disposed at or near the end of the opposing member 11, abuts the sealing ring 13 and is fitted in the ring-shaped groove 6. In this state, the sealing ring 13 is pushed outward in the radial direction by the engagement projection 12, thereby applying more pressure against the ring-shaped groove 6. As a result, adequate sealing properties can be provided even with the use of the low fuel permeability resin layer 10 on the inner perimeter surface of the ring-shaped groove 6.

The tongue piece 7 described above on the side wall of the ring-shaped groove 6 forms a cavity for supporting the sealing ring 13 similar to the ring supporting section 8 formed on the opposing side wall of the ring-shaped groove 6. Thus, in addition to the advantages described above, the presence of the tongue piece 7 in the ring-shaped groove 6 provides additional support for the sealing ring 13 by forming a ring supporting cavity. This additional support for the sealing ring 13 prevents misalignment of the sealing ring 13 effectively, especially toward the end side of the fuel hose along the hose axis of the ring-shaped groove 6.

According to another embodiment of the present invention, a fuel hose connection structure includes a fuel hose, a sealing ring, and an opposing member formed as a hard tube, as described above. The sealing ring is tightly fitted into a ring-shaped groove of the fuel hose. The hard, tube-shaped opposing member is inserted so that an expanded, ring-shaped engagement projection abuts the sealing ring. The engagement projections is located at an end or near the end of the opposing member on the outer perimeter surface of the opposing member.

In addition to the advantages described above, the fuel hose connection structure according to the present invention provides an easy-to-use structure that is simple and inexpensive without requiring any special increases in cost. Furthermore, as described above, the pipe connection section has low fuel permeability and good fuel sealing properties.

According to another embodiment of the present invention, the sealing ring can have a ring shape having fixed, belt-type axial width.

A sealing ring that is formed with a ring shape having a fixed, belt-type axial width provides a large contact surface with the inserted opposing member. Thus, good sealing properties are provided. Also, the sealing ring is firmly secured to the ring-shaped groove when the opposing member is inserted.

According to another embodiment of the present invention, the sealing ring can have an arcuate cross-sectional shape along an axis of the sealing ring and/or a ridge projecting outward in the radial direction on the outer perimeter surface of the sealing ring.

If the sealing ring is formed with an arcuate cross-sectional shape along an axis of the sealing ring, a flat cross-sectional shape is formed between the opposing member and the ring-shaped groove, with the sealing ring applying a force to restore its original arcuate cross-sectional shape. Thus, the ends of the sealing ring along the axis press strongly against the opposing member or the ring-shaped groove, thereby improving the sealing properties. If the axial cross-sectional shape of the sealing ring is arced outward in the radial direction so that the ends of the sealing ring along the axis project outward in the radial direction, the sealing ring is pressed strongly against the ring-shaped groove, thereby improving the sealing properties substantially.

Also, if a ridge projecting outward in the radial direction is located on the outer perimeter surface of the sealing ring, the ridge is pressed firmly against the bottom wall of the ring-shaped groove and pushes slightly into the bottom wall of the ring-shaped groove. Thus, even if the hose tube or the sealing ring deteriorates, high sealing properties can be maintained at the ridge.

According to an embodiment of the present invention, the sealing ring can be positioned so that the ridge described above is aligned with the apex of the ring-shaped engagement projection on the opposing member.

The ring-shaped sealing ring with a fixed belt-shape axial width receives firm sealing pressure when aligned with the engagement projection of the opposing member after the opposing member is inserted. A ridge can be positioned to align with the ring-shaped engagement projection on the opposing member, so that the pressure of the ridge on the bottom wall of the ring-shaped groove is especially adequate.

The above and other advantages of the invention will become more apparent in the following description and the accompanying drawings.

BRIEF DESCRIPTION OF THE DRAWINGS

FIG. 2b is an axial, partial cross-sectional drawing of a step of a fuel hose connection method following the step shown in FIG. 2a;

DETAILED DESCRIPTION OF THE PREFERRED EMBODIMENTS

The Fuel Hose

A fuel hose according to the present invention includes a hose tube and a resin layer. The resin layer is located at a predetermined position on the inner perimeter surface of the fuel hose and has low fuel permeability. The hose tube can be formed as the outermost layer of the fuel hose, but a more suitable hose construction element can be used to construct the outermost layer of the fuel hose on the outer perimeter surface of the hose tube. Examples of hose construction elements include a resin layer; a reinforcement thread layer; a thin metal film layer or a metal laminate layer; an outer protector layer made of rubber or elastomer; or a combination of two or more of these layers. If one or more of these hose construction element are included on the outer perimeter surface of the hose tube, the hose construction elements can extend over the entire length of the outer perimeter surface of the hose tube or the hose construction elements can extend over the outer perimeter surface of the hose tube with the exception of the opposing member insertion section.

A straight opposing member insertion section is located at an axial end of the hose tube. There are no restrictions on the shape of the hose tube other than the straightness of the opposing member insertion section. For example, the hose tube can be a straight tube, a tube with at least one bend, a straight tube or a tube with at least one bend having at least one section of corrugated tube, or the like.

The hose tube is made of rubber or elastomer. There are no restrictions on the type of rubber or elastomer for the hose tube. The rubber or elastomer can be selected to have low fuel permeability, good durability against fuel, and the like, e.g., fluoro rubber (FKM), acrylonitrile-butadiene rubber (NBR), a blend of acrylonitrile-butadiene rubber and polyvinyl chloride (NBR/PVC), hydrogenated acrylonitrile-butadiene rubber with hydrogen (H-NBR), epichlorohydrin rubber (ECO), or the like.

There are no restrictions on the method for making the hose tube. One effective method for making the hose tube involves forming the hose tube using a mold, for example, by injection molding. The hose tube is molded together with the opposing member insertion section having ring-shaped grooves, so that vulcanization and other necessary processes can be performed.

The Opposing Member Insertion Section

The opposing member insertion section is located on one or both ends of the hose tube along the axis of the hose tube. A "straight" opposing member insertion section refers to the absence of bends and corrugated tubing. Being "straight" does not indicate that the opposing member insertion section is smooth, i.e., having no protrusions or indentations on the outer perimeter surface or the inner perimeter surface. However, the opposing member insertion section can be formed as a smooth cylinder with no protrusions or indentations on the inner perimeter surface. Protrusions or indentations on the outer perimeter surface can serve as outer perimeter projections, mark projections, or the like. Outer perimeter projections can maintain the thickness of the section of the hose tube with the ring-shaped grooves. Mark projections can align a tightening clamp which is used after connecting the fuel hose.

Outer perimeter projections can maintain the thickness of the section of the hose tube with the ring-shaped grooves, but outer perimeter projections can also provide extra thickness outward in the radial direction from the outer perimeter surface of the section of the hose tube with the ring-shaped grooves. The extra thickness provided by the outer perimeter projections can maintain good sealing properties as the surfaces of the hose tube and the sealing ring deteriorate over time. No specific thicknesses are necessary, but the thickness of the outer perimeter projection can be 30–100% or 50–70% thicker than the other sections of the wall of the opposing member insertion section. Alternatively, the thickness of the outer perimeter projection can be 2–4 mm thicker than other sections of the wall of the opposing member insertion section.

To maintain good sealing properties that withstand deterioration of the tube wall and the sealing material, a clamp or a ring can be pre-mounted on the outer perimeter surface of the tube wall at the section where the ring-shaped grooves are formed on the opposing member insertion section. A ring can be mounted securely before insertion of the opposing member. A clamp can be mounted and tightened securely before insertion of the opposing member, but the clamp can also be mounted in a non-tightened state before insertion of the opposing member and then tightened after insertion. There are no restrictions on the type of clamp, but an example is a metallic spring-action hose clamp. Also, there are no restrictions on the type of ring, but an example is a ring formed from a non-expanding material such as resin, metal, or hard rubber.

Ring-shaped grooves are formed on the inner perimeter surface toward the center side of the fuel hose along the hose axis of the opposing member insertion section. The inner diameter of the opposing member insertion section, excluding the ring-shaped grooves, allows the insertion of the hard, tube-shaped opposing member. Thus, the inner diameter of the opposing member insertion section, excluding the ring-shaped grooves, may or may not be identical to the inner diameter of the ring-shaped grooves which are positioned toward the center side of the fuel hose along the hose axis.

The Ring-Shaped Groove and The Sealing Ring

The ring-shaped groove can be formed with either a ring-shaped tongue piece or a ring-shaped ring supporting section. The tongue piece has a sloped surface hanging over the ring-shaped groove and extends inward in the radial direction from the side wall of the ring-shaped groove toward the end side of the fuel hose along the hose axis. The ring supporting section is a cavity that points toward the center side of the fuel hose along the hose axis and is located on the opposing side wall of the ring-shaped groove toward the center side of the fuel hose of the hose axis. Alternatively, the ring-shaped groove can have both the tongue piece and the ring supporting section. The tongue piece effectively forms a ring-supporting cavity structure on the side wall of the ring-shaped groove that is similar to the ring supporting section on the opposing side wall of the ring-shaped groove.

A stopper can extend inward in the radial direction on the radially inward side of the opposing side wall of the ring-shaped groove positioned toward the center side of the fuel hose along the hose axis. The stopper can extend further toward the hose axis than the inner perimeter surface of the opposing member insertion section. The stopper can be formed along the entire perimeter surface of the radially inward side of the opposing side wall of the ring-shaped groove, but the stopper can also be formed only on a section of the radially inward side of the opposing side wall. The entire inner perimeter surface of the ring-shaped groove, including the tongue piece, the ring supporting section, and the stopper, are covered with a thin, low fuel permeability resin layer.

There are no special restrictions on the material used for the sealing ring, but the sealing ring can be made from a resin, a rubber, or an elastomer material. A rubber or elastomer material are preferable. For the same reasons described above with regard to the hose tube, the sealing ring can be made of rubber or elastomers such as FKM, NBR, NBR/PVB, H-NBR, ECO, or the like.

The ring-shaped groove is formed to allow the sealing ring to be inserted and fitted into the ring-shaped groove. Thus, the ring-shaped cross-section of the sealing ring corresponds roughly to the shape of the cross-section of the ring-shaped space formed by the ring-shaped groove, which includes the low fuel permeability resin layer and the tongue piece, the ring-supporting section, and the stopper, if present. The sealing ring can be formed in a ring shape having an outer diameter larger than the outer diameter of the space inside the ring-shaped groove. However, the inner perimeter of the sealing ring must not project inward in the radial direction from the ring-shaped groove when the sealing ring is inserted and fitted inside the ring-shaped groove. Thus, the radial thickness of the sealing ring is roughly identical or less than the radial depth of the ring-shaped groove. In either case, the operation and advantages of the tongue piece described above are maintained.

There are no restrictions on the ring-shaped cross-section of the sealing ring but, as shown in FIGS. 2a–2d, the sealing ring can have a fixed axial width that forms a belt shape. In FIGS. 2a–2d, the ring-shaped groove has a cross-sectional shape that corresponds to the shape of the sealing ring. Furthermore, in FIGS. 2a–2d, the axial width of an engagement projection, described later, of the opposing member is roughly identical to the axial width of the ring-shaped groove. However, the axial width of the ring-shaped groove can be smaller than the axial width of the engagement projection of the opposing member.

To maintain good sealing properties that withstand aging of the tube wall and the sealing ring, the inner perimeter surface of the ring-shaped groove can be extended inward in the radial direction. There are no restrictions on the extended thickness, but the thickness can be 5–50% or 25–50% thicker than the other wall sections in the opposing member insertion section. Alternatively, the thickness can be, for example, 2.5–5 mm thicker than the other wall sections in the opposing member insertion section.

To maintain good sealing properties that withstand aging, a ridge can project inward in the radial direction on the inner perimeter surface of the ring-shaped groove. The ridge can have a height of approximately 0.5–1 mm in the radial direction of the ring-shaped groove. The number or lateral positions of the ridges are not restricted. If the ring-shaped groove has a shape similar to a ring-shaped sealing ring with a fixed axial belt-shaped width, the ring-shaped groove can have a single ridge aligned with the peak of the ring-shaped engagement projection on the opposing member.

To maintain good sealing properties that withstand aging, the sealing ring can have a fixed, belt-shaped axial width as described above and an arcuate cross-sectional shape. The arcuate cross-sectional shape of the sealing ring can have an arc that is curved outward in the radial direction (i.e., the sides of the cross-section along the axis of the sealing ring project outward outward in the radial direction). The ring-shaped groove has a belt-shaped width, but the cross-sectional shape of the ring-shaped groove is not curved to match the sealing ring.

To maintain sealing properties that withstand aging, a ridge can project outward in the radial direction from the outer perimeter of different types of sealing rings. The ridge has, for example, a height of approximately 0.5–1 mm, but the number and position along the width of the sealing ring of the ridge is not restricted. If the sealing ring is a ring-shaped sealing ring with a fixed, belt-shaped width, one ridge can be positioned to align with the apex of a ring-shaped engagement projection on the opposing member.

The Low Fuel Permeability Resin Layer

The low fuel permeability resin layer is a thin layer having a thickness of approximately 500–50 microns, for example. The resin layer covers the inner perimeter surface of the ring-shaped groove and the entire inner perimeter surface of the hose tube from the ring-shaped groove toward the center side of the fuel hose along the hose axis. The resin layer can be adhered to the inner perimeter surface of the hose tube. There are no special restrictions on the material for resin layer as long as the material has low fuel permeability, but the resin layer can be made of a fluoro resin, such as a copolymer resin of polyvinylidene fluoride or vinylidene fluoride (e.g., a copolymer resin of vinylidene fluoride and chlorotrifluoroethylene). Also, the resin layer can be made of a polyester resin such as polybutylene naphthalate or polybutylene terephthalate.

There are no restrictions on the method for forming the low fuel permeability resin layer as long as the method can form the resin layer on the hose tube while excluding a predetermined section of the inner perimeter surface of the hose tube as described above. An example of a method for forming the resin layer is electrostatic coating. In this method, the specific section of the inner perimeter surface of the hose tube is masked using an arbitrary method for masking. Then, a layer of resin powder is applied to the inner perimeter surface of the hose tube using electrostatic coating. The mask is then removed, and the layer of resin powder is fused by heating, thus forming a fused film. Another example of a method for forming the resin layer is blow molding. In this method, the inner tube of resin that forms the low permeability resin layer is formed by blow molding, and the inner tube of resin is inserted into an outer layer cover hose. In this method, the inner tube of resin and the outer layer cover hose can have mutually engaging projections or the like. The low permeability resin layer can be formed from the inner tube of resin by extrusion and then inserted into an outer layer cover hose.

The Opposing Member

The hard, tube-shaped opposing member is generally a pipe for connecting to a hose. The opposing member is made of a hard resin, a metal, or the like. The opposing member for connecting to a fuel hose has a ring-shaped engagement projection extending from the outer perimeter surface at or near the end of the opposing member. There are no restrictions on the cross-sectional shape of the engagement projection, but it can form a hill that projects slightly into the ring-shaped groove. The axial width of the engagement projection can be roughly identical to the axial width of the ring-shaped groove, but the engagement projection can have a slightly narrower axial width than the axial width of the ring-shaped groove.

Figure 3:
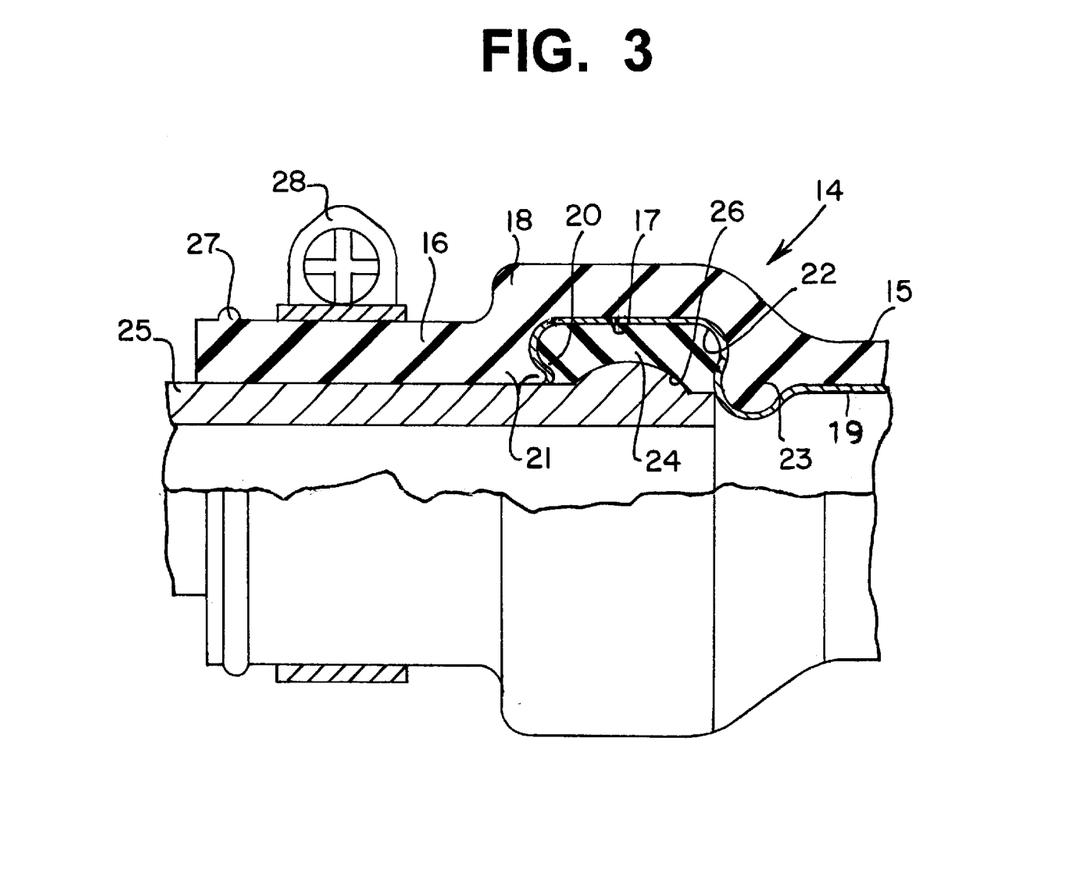
FIG. 3 is an axial, partial cross-sectional drawing of a fuel hose connection structure according to an embodiment of the present invention.

An Embodiment of the Present Invention (FIG. 3)

FIG. 3 shows a fuel hose connection structure according to an embodiment of the present invention. The scope of the present invention is not restricted in any way by this embodiment.

A fuel hose 14 shown in FIG. 3 has a straight opposing member insertion section 16 formed at the end of a metal or resin hose tube 15. Along an axis of the fuel hose 14 (i.e., the hose axis), there is an end side (to the left in FIG. 3) and a center side (to the right in FIG. 3) of the fuel hose. A ring-shaped groove 17 is formed on the inner perimeter surface of the opposing member insertion section 16 toward the center side of the fuel hose along the hose axis. A thick section 18 extends outward in the radial direction from the outer perimeter section of the hose tube 15 to reinforce the thickness of the opposing member insertion section 16. Also, a thin resin layer 19 having a thickness of 200 microns is applied over the inner perimeter surface of the ring-shaped groove 17 and over the entire inner perimeter surface of the hose tube 15 that spans from the ring-shaped groove 17 to the center side of the fuel hose along the hose axis. The resin layer 19 has low fuel permeability and is made of a fluororesin. An electrostatic coating method is used to apply the resin layer 19 to ensure a tight and secure coating.

A ring-shaped tongue piece 21 is located on the side wall of the ring-shaped groove 17 that is positioned toward the end side of the fuel hose along the hose axis. The tongue piece 21 has a sloped surface 20 and an overhang relative to the ring-shaped groove 17, and the tongue piece 21 is located inward in the radial direction on the side wall of the ring-shaped groove 17. A ring-shaped ring supporting section 22 is an indentation located on on the opposing side wall of the ring-shaped groove 17 that is positioned toward the center side of the fuel hose along the hose axis. Additionally, a ring-shaped stopper 23 is located inward in the radial direction on the opposing side wall of the ring-shaped groove 17 that is positioned toward the center side of the fuel hose along the hose axis on the ring-shaped groove 17. The stopper 23 extends inward in the radial direction farther than the inner perimeter surface of the opposing member insertion section 16.

A ring-shaped fluoro rubber sealing ring 24 fits inside the ring-shaped groove 17. Before being placed inside the ring-shaped groove 17, the outer diameter of the sealing ring 24 is larger than the outer diameter of the space inside the ring-shaped groove 17 and the radial thickness of the sealing ring 24 is identical to or smaller than the radial depth of the ring-shaped groove 17. Thus, the ring-shaped groove 17 applies a compressive force on the sealing ring 24 that causes the sealing ring 24 to contract slightly toward the inner perimeter, thus making the sealing ring 24 roughly co-planar with the inner perimeter surface of the opposing member insertion section 16.

A hard, tube-shaped opposing member 25 made of metal or resin is pushed into the opposing member insertion section 16 having the ring-shaped groove 17 with the sealing ring 24 as described above. The operation and advantages of inserting the opposing member 25 are described above. The insertion position of the opposing member 25 is restricted by the stopper 23. An engagement projection 26 on the opposing member 25 extends in a ring-shaped manner from the outer perimeter surface of the opposing member 25 and abuts the sealing ring 24. The engagement projection 26 pushes the sealing ring 24 firmly outward in the radial direction. Thus, the boundary surface between the sealing ring 24 and the ring-shaped groove 17 and the boundary surface between the sealing ring 24 and the engagement projection 26 are firmly sealed with no gaps, thus providing superior fuel sealing properties.

Also, the fuel impermeable opposing member 25 and the low fuel permeability resin layer 19 of the hose tube 15 are almost the only sections of the fuel hose connection structure that contact the fuel (i.e., the internal fluid such as gasoline). As shown in FIG. 3, the low fuel permeability resin layer 19 of the hose tube 15 extends toward the tongue piece 21, which fuel cannot contact. Thus, the fuel hose connection structure according to the present invention has a high degree of impermeability to fuel.

A hose clamp 28 is mounted on the outer perimeter surface of the opposing member insertion section 16 into which the opposing member 25 has been inserted. The hose clamp 28 has a structure suitable for tightening the connection section of the opposing member insertion section 16 and is positioned using a clamp positioning projection 27 as an index.

An Embodiment of the Present Invention (FIGS. 4–12)

FIGS. 4–12 show fuel hose connection structures according to other embodiments of the present invention. The scope of the present invention is in no way restricted by these embodiments.

In FIGS. 4–11, a thin low fuel permeability resin layer 19 is disposed as in FIG. 3, but the resin layer 19 is omitted from FIGS. 4–11. Also, in the embodiments shown in FIGS. 4–12, the engagement projection 26 is located at the end of the opposing member 25, and the sealing ring 24 is formed as a ring-shaped belt having a fixed width. In the embodiments shown in FIGS. 4–11, the outline of the opposing member 25 which is hidden behind an opposing member insertion section 30 is shown by dotted lines in order to facilitate illustration of the other features. Furthermore, the only features shown in FIG. 12 are on the outer surface of the upper half of the opposing member insertion section 30 of the fuel hose 29.

Figure 4:
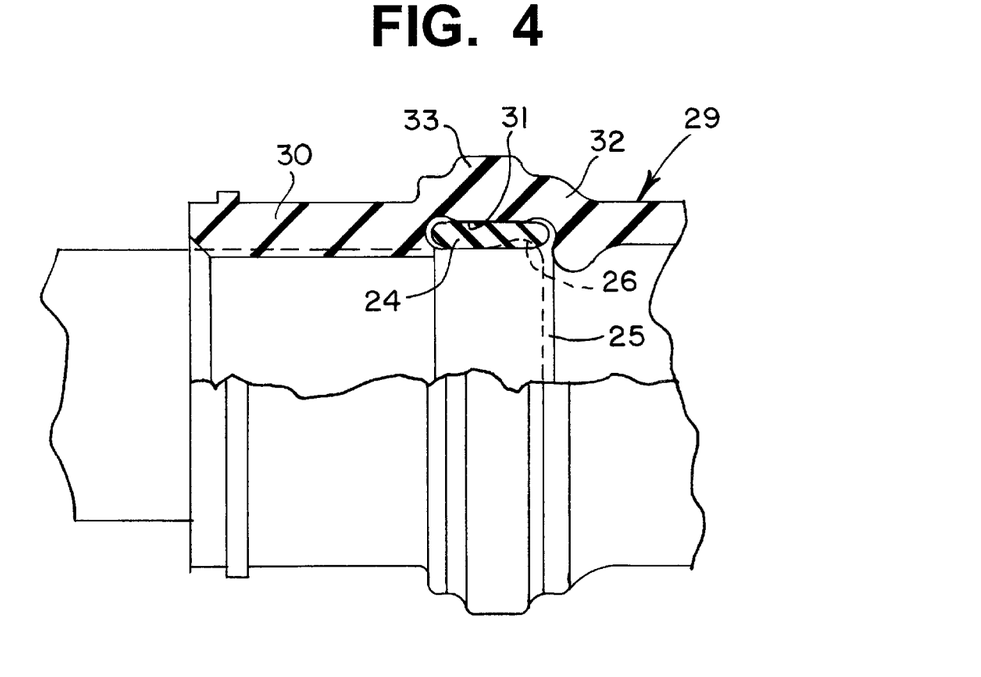
FIG. 4 is an axial, partial cross-sectional drawing of a fuel hose connection structure according to an embodiment of the present invention.

In the embodiment shown in FIG. 4, the opposing member insertion section 30 of the fuel hose 29 has a tube wall 32. A thick wall 33 is located on the outer perimeter surface of the tube wall 32 and is aligned with the ring-shaped groove 31. This thick wall 33 is located at the center of the tube wall 32 and is approximately 50% thicker than the tube walls 32 on either side of the thick wall 33.

Figure 5:
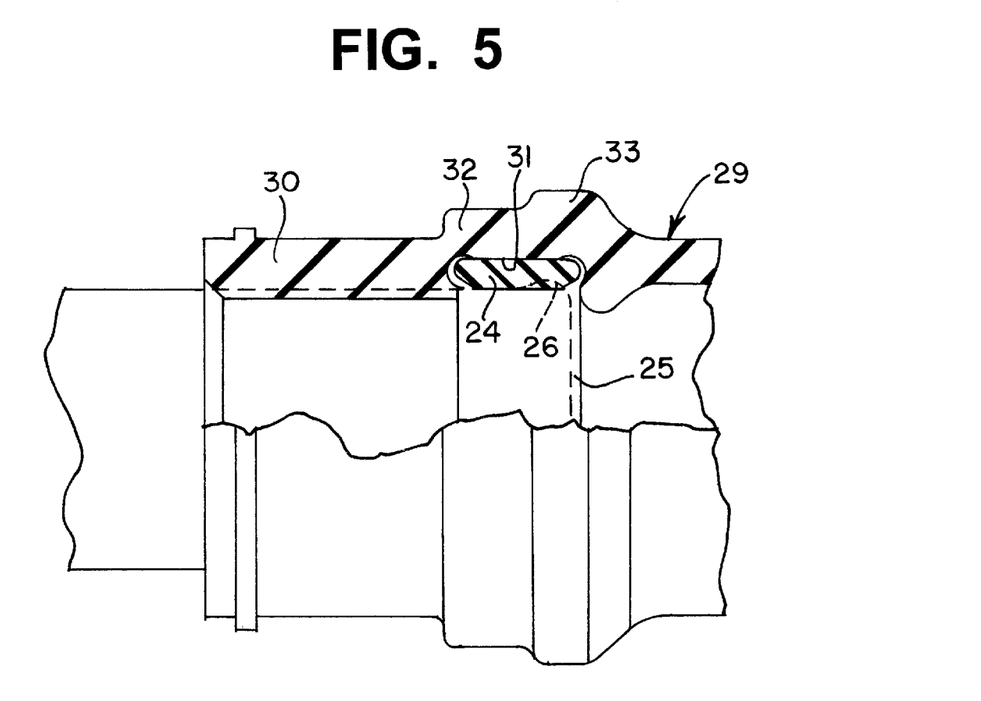
FIG. 5 is an axial, partial cross-sectional drawing of a fuel hose connection structure according to an embodiment of the present invention.

In the embodiment shown in FIG. 5, the opposing member insertion section 30 of the fuel hose 29 has a tube wall 32. A thick wall 33 is located on the outer perimeter surface of the tube wall 32 and is aligned with the ring-shaped groove 31. The thick wall 33 is 50% thicker than the tube wall 32 beside the thick wall 33. However, the thick wall 33 is different from the thick wall 33 shown in FIG. 4 since the thick wall 33 shown in FIG. 5 is located on the tube wall 32 toward the center side of the fuel hose along the hose axis. The thick wall 33 is aligned with the apex of the engagement projection 26 of the opposing member 25 when the opposing member 25 is inserted.

Figure 6:
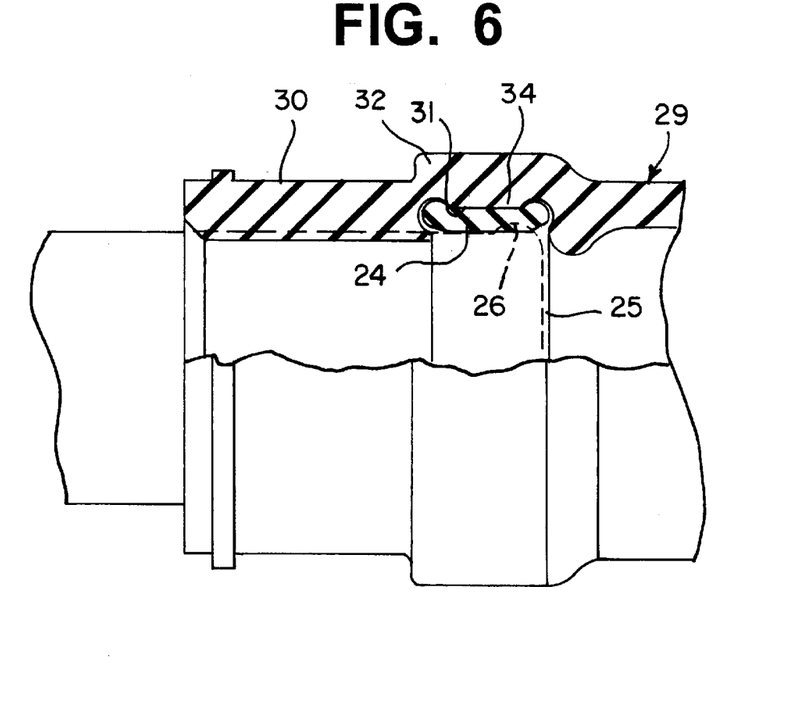
FIG. 6 is an axial, partial cross-sectional drawing of a fuel hose connection structure according to an embodiment of the present invention.

In the embodiment shown in FIG. 6, the opposing member insertion section 30 of the fuel hose 29 has a ring-shaped groove 31. A thick wall 34 is located on the outer perimeter surface of ring-shaped groove 31 so that the inner perimeter surface of the ring-shaped groove 31 extends farther inward in the radial direction than in the embodiments shown in FIGS. 4 and 5. The thick wall 34 is approximately 15% thicker than the tube wall 32 on either side.

Figure 7:
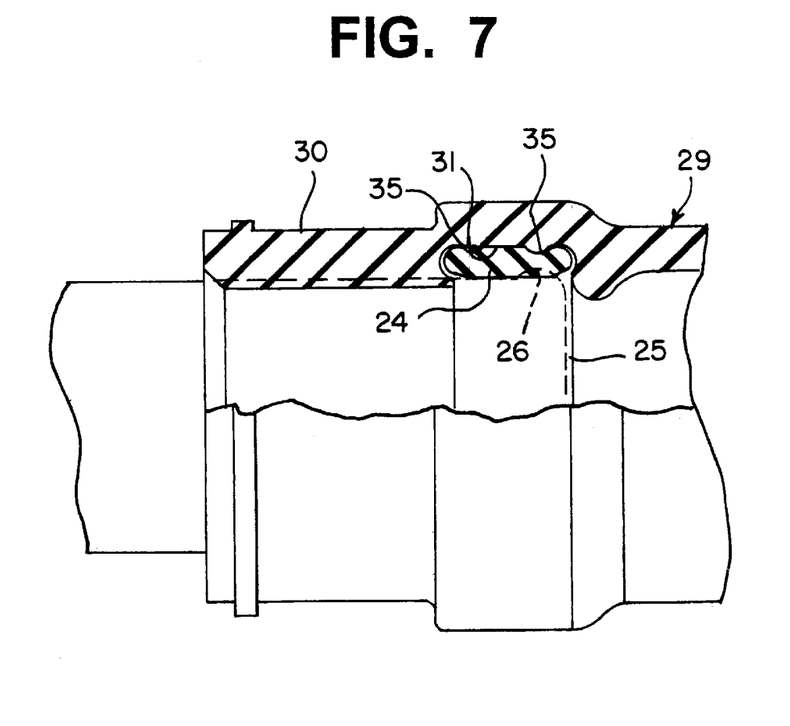
FIG. 7 is an axial, partial cross-sectional drawing of a fuel hose connection structure according to an embodiment of the present invention.

In the embodiment shown in FIG. 7, the opposing member insertion section 30 of the fuel hose 29 has a plurality of ridges 35 projecting inward in the radial direction from the inner perimeter surface of the ring-shaped groove 31. The position of the ridges 35 do not have a specific relation to the position of the engagement projection 26 of the opposing member 25.

Figure 8:
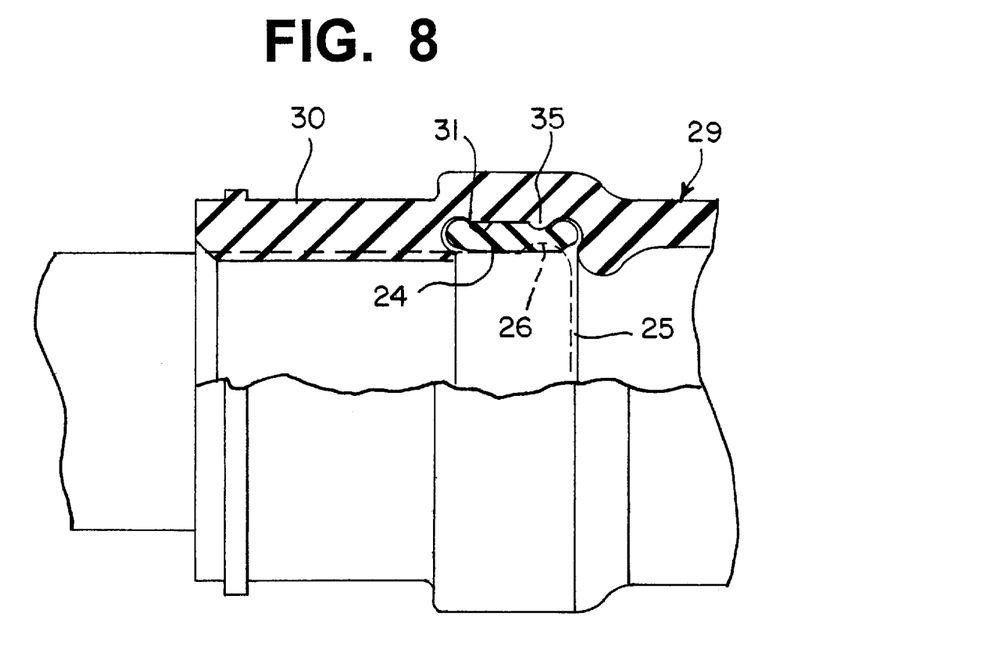
FIG. 8 is an axial, partial cross-sectional drawing of a fuel hose connection structure according to an embodiment of the present invention.

In the embodiment shown in FIG. 8, the opposing member insertion section 30 of the fuel hose 29 has a thick wall 34 aligned with the ring-shaped groove 31 and a single ridge 35 that projects inward in the radial direction from the inner perimeter surface of the ring-shaped groove 31. The ridge 35 is aligned with the apex of the engagement projection 26 when the opposing member 25 is inserted.

Figure 9:
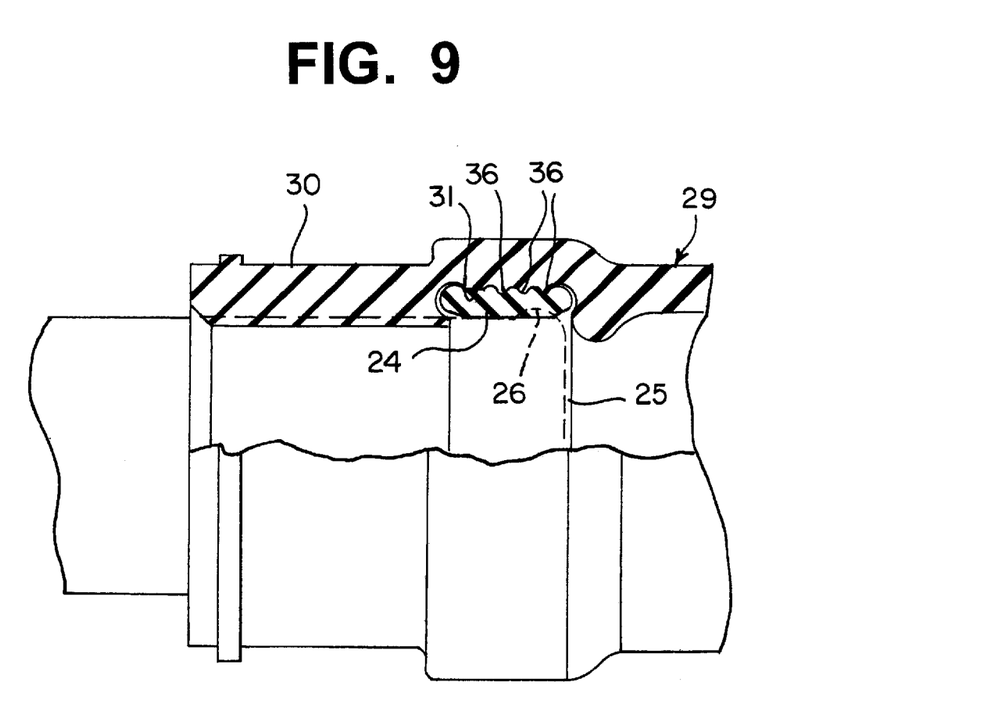
FIG. 9 is an axial, partial cross-sectional drawing of a fuel hose connection structure according to an embodiment of the present invention.

In the embodiment shown in FIG. 9, a plurality of ridges 36 projects outward in the radial direction from the outer perimeter surface of the sealing ring 24 (i.e., toward the inner perimeter surface of the ring-shaped groove 31). The positions of the ridges 36 do not have a specific relation to the position of the engagement projection 26 of the opposing member 25.

Figure 10:
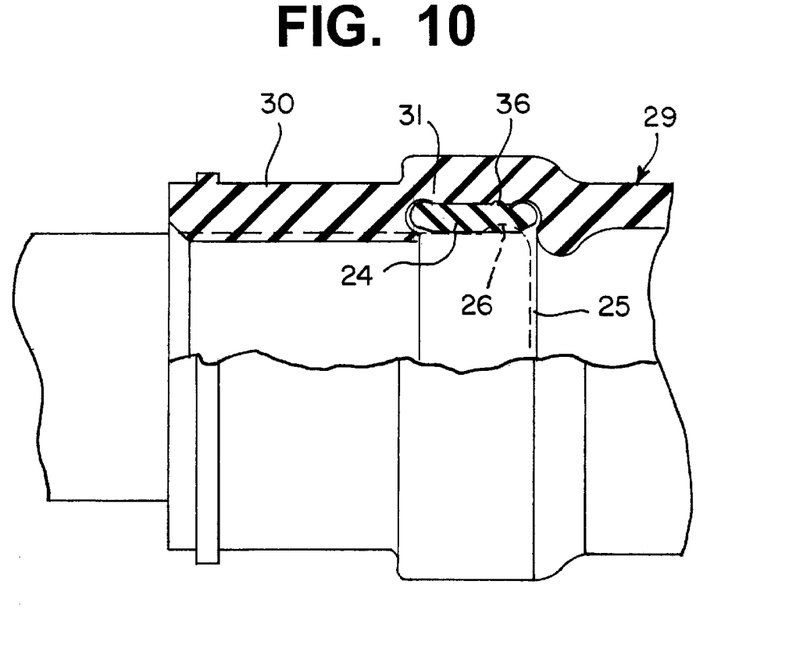
FIG. 10 is an axial, partial cross-sectional drawing of a fuel hose connection structure according to an embodiment of the present invention.

In the embodiment shown in FIG. 10, a single ridge 36 is disposed projects outward in the radial direction from the outer perimeter surface of the sealing ring 24. The ridge 36 is aligned with the apex of the engagement projection 26 when the opposing member 25 is inserted.

Figure 11:
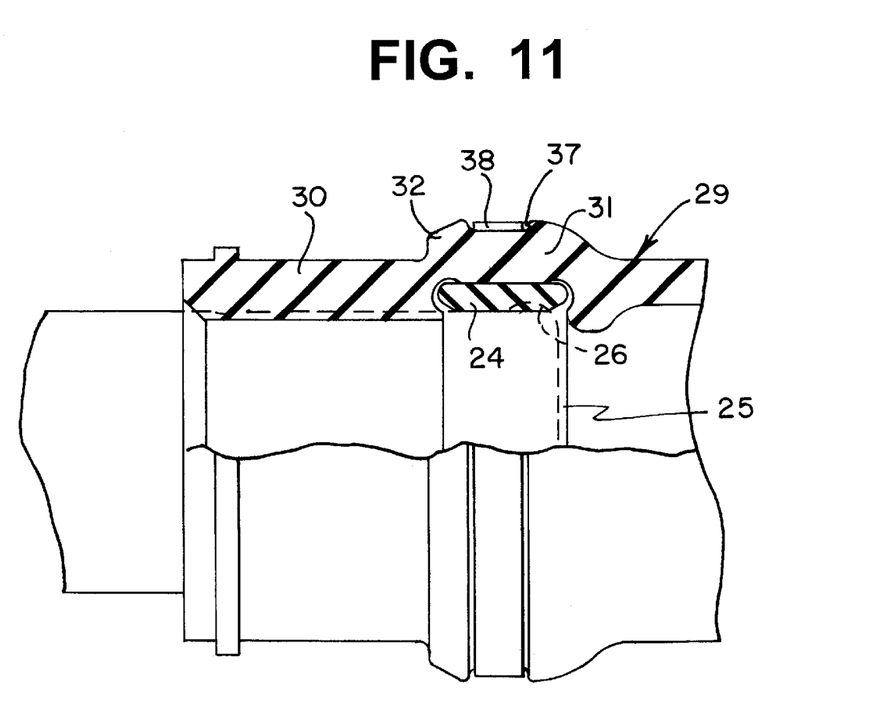
FIG. 11 is an axial, partial cross-sectional drawing of a fuel hose connection structure according to an embodiment of the present invention.
Figure 12:
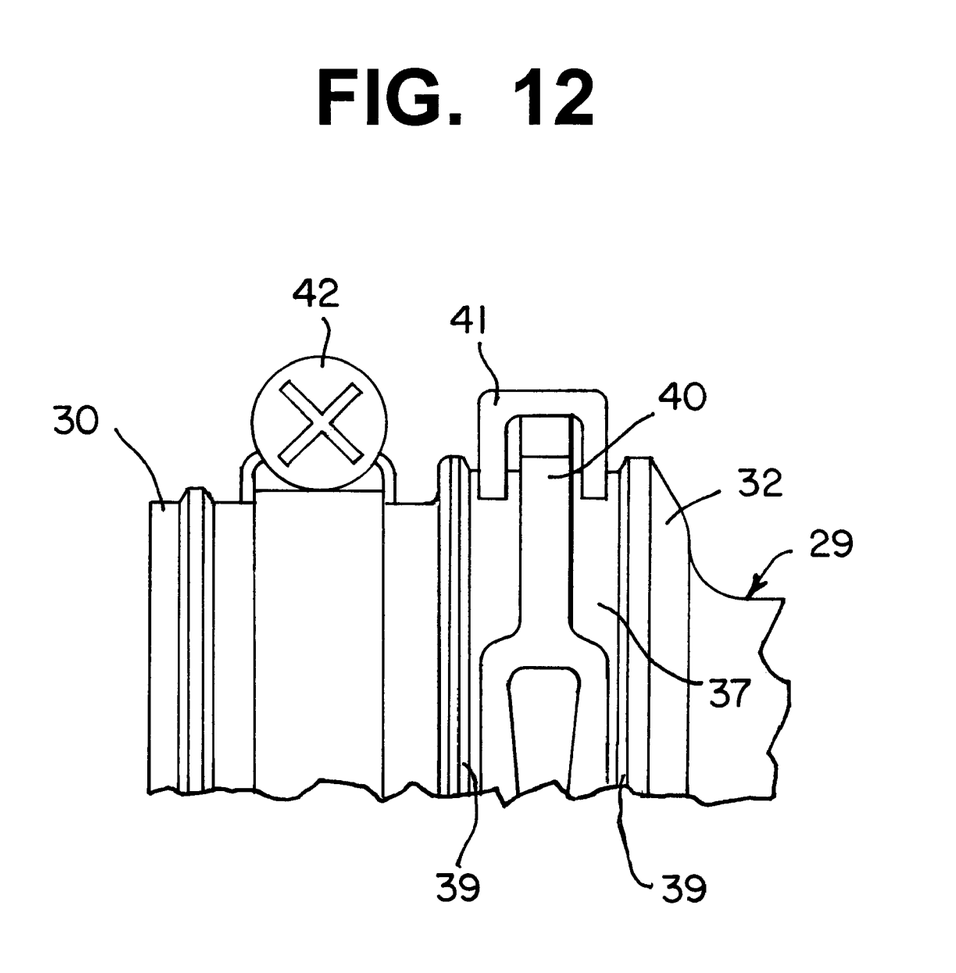
FIG. 12 is an axial, partial drawing of a fuel hose connection structure according to an embodiment of the present invention.

In the embodiment shown in FIG. 11, a groove 37 is located on the outer perimeter surface of the tube wall 32, which is aligned with the ring-shaped groove 31 on the opposing member insertion section 30 of the fuel hose 29. A non-compressive ring 38 fits tightly on the groove 37. The ring 38 is mounted on the groove 37 before the opposing member 25 is inserted into the opposing member insertion section 30.

The embodiment shown in FIG. 12 is similar to the embodiment shown in FIG. 11 since there is a groove 37 located on the outer perimeter surface of the tube wall 32, which is aligned with the ring-shaped groove 31 on the opposing member insertion section 30 of the fuel hose 29. A spring-action hose clamp 40 is aligned by a pair of positioning spools 39 and is tightened onto the groove 37. The contraction of the hose clamp 40 in the radial direction is supported by a clip (not shown) of a claw piece 41. After the fuel hose 29 is mounted in this manner, the clip is removed upon insertion of the opposing member, thereby resulting in a tight connection. A worm gear clamp 42 is also mounted on the opposing member insertion section 30 to secure the hose connection.

While the preferred embodiments have been described, variations thereto will occur to those skilled in the art within the scope of the present inventive concepts which are delineated by the following claims.

What is claimed is:

1. A fuel hose comprising:
   a hose tube comprising a material selected from the group consisting of a rubber and an elastomer and having an inner perimeter surface;
   a straight opposing member insertion section at an end of said hose tube and having an inner perimeter surface;
   a ring-shaped groove, adapted for insertion and fitting of a sealing ring, located on said inner perimeter surface of said opposing member insertion section toward a center side along an axis of said hose, said ring-shaped groove having an inner perimeter surface, a first side wall toward an end of said hose along said hose axis, and a second side wall toward said center side of said hose along said hose axis;
   a ring-shaped tongue piece having a sloped surface and hanging over said ring-shaped groove and located inwardly in the radial direction at an end of said first side wall of said ring-shaped groove; and
   a thin low fuel permeability resin layer covering said inner perimeter surface of said ring-shaped groove, said tongue piece, and said entire inner perimeter surface of said hose tube toward said center side of said hose along said hose axis past said ring-shaped groove.

2. A fuel hose as described in claim 1 wherein said ring-shaped groove further comprises a ring-shaped ring supporting section depressed toward said center side of said hose along said hose axis and located on said ring-shaped groove toward said center side of said hose along said hose axis.

3. A fuel hose as described in claim 1 wherein a stopper projecting inwardly in the radial direction past said inner perimeter surface of said opposing insertion member is located at a radially inwardly end of said second side wall of said ring-shaped groove.

4. A fuel hose as described in claim 1 further comprising:
   a tube wall at an outer perimeter section of said opposing member insertion section where said ring-shaped groove is formed; and
   a section on said outer perimeter section of said tube wall, that is thicker outwardly in the radial direction.

5. A fuel hose as described in claim 4 wherein:
   said ring-shaped groove is shaped to match a ring-shaped sealing ring having a fixed, belt-shaped axial width; and
   said thickened section is located on said outer perimeter section of said tube wall so that said thickened section aligns with an apex of an engagement projection expanded in a ring-shaped manner from said opposing member to be inserted.

6. A fuel hose as described in claim 1 wherein:
   said tube wall has an inner perimeter section at said ring-shaped groove section of said opposing member insertion section; and
   said inner perimeter section of said tube wall is thicker inwardly in the radial direction.

7. A fuel hose as described in claim 1 wherein a ridge projects inwardly in the radial direction from said inner perimeter section of said tube wall at said ring-shaped groove section of said opposing member insertion section.

8. A fuel hose as described in claim 7 wherein:
   said ring-shaped groove is shaped to match a ring-shaped sealing ring having a fixed, belt-shaped axial width; and
   said ridge is located on said tube wall where said ring-shaped groove is formed so that said ridge aligns with an apex of an engagement projection expanded in a ring-shaped manner from said opposing member to be inserted.

9. A fuel hose as described in claim 1 wherein a member selected from the group consisting of a clamp and a ring is tightly mounted to an outer perimeter section of said tube wall where said ring-shaped groove is formed on said opposing member insertion section.

10. A fuel hose as described in claim 1 wherein a section of said fuel hose toward said center side of said hose along said hose axis relative to said opposing member insertion section comprises a member selected from the group consisting of:
    a straight tube;
    a tube with at least one bent section;
    a straight tube with at least one section forming a corrugated tube; and
    a tube with at least one bent section and at least one section forming a corrugated tube.

11. A fuel hose as described in claim 1 wherein an outer perimeter surface of said hose tube comprises at least one member of the group consisting of:
    a resin layer;
    a reinforcement thread layer;
    a thin metal film layer;
    a metal laminate layer;
    a rubber outer protector layer; and
    an elastomer outer protector layer.

12. A fuel hose connection method comprising:
    tightly inserting and fitting a sealing ring into a ring-shaped groove of a fuel hose as defined in claim 1;

pushing a hard, tube-shaped opposing member into said fuel hose, said opposing member having an engagement projection expanding in a ring-shaped manner from an outer perimeter surface of said opposing member at an end or near an end of said opposing member, and said opposing member being pushed to a position where said engagement projection abuts said sealing ring.

13. A fuel hose connecting method as described in claim 12 wherein said inserting said sealing ring is preceded by tightly mounting a ring to an outer perimeter section of a tube wall of said opposing member insertion section of said fuel hose where said ring-shaped groove is formed.

14. A fuel hose connecting method as described in claim 12 wherein:

inserting said sealing ring is preceded by mounting an untightened clamp to an outer perimeter section of a tube wall of said opposing member insertion section of said fuel hose where said ring-shaped groove is formed; and tightening said clamp follows said inserting said opposing member.

15. A fuel hose connection structure comprising:

a fuel hose, a sealing ring, and a hard, tube-shaped opposing member, as defined in claim 1;

wherein:

said sealing ring is tightly fitted into a ring-shaped groove of said fuel hose; and said opposing member is pushed to a position where an expanded, ring-shaped engagement projection formed on an outer perimeter of said opposing member at an end or near said end of said opposing member abuts said sealing ring.

16. A fuel hose connection structure as described in claim 15 wherein said sealing ring is formed with a ring shape having a fixed, belt-shaped axial width.

17. A fuel hose connection structure as described in claim 16 wherein said sealing ring is formed with an arcuate cross-sectional shape along an axis of said sealing ring.

18. A fuel hose connection structure as described in claim 16 wherein a ridge projecting inwardly in the radial direction is located on an outer perimeter surface of said sealing ring.

19. A fuel hose connection structure as described in claim 18 wherein said ridge on said sealing ring is aligned with said engagement projection on said opposing member.

* * * * *